United States Patent
Imanaka

(10) Patent No.: US 12,504,485 B2
(45) Date of Patent: Dec. 23, 2025

(54) MAGNETIC SENSOR

(71) Applicant: Panasonic Intellectual Property Management Co., Ltd., Osaka (JP)

(72) Inventor: Takashi Imanaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 70 days.

(21) Appl. No.: 18/256,351

(22) PCT Filed: Dec. 6, 2021

(86) PCT No.: PCT/JP2021/044796
§ 371 (c)(1),
(2) Date: Jun. 7, 2023

(87) PCT Pub. No.: WO2022/131060
PCT Pub. Date: Jun. 23, 2022

(65) Prior Publication Data
US 2024/0019504 A1 Jan. 18, 2024

(30) Foreign Application Priority Data

Dec. 18, 2020 (JP) .................. 2020-210794

(51) Int. Cl.
G01R 33/00 (2006.01)
G01R 33/09 (2006.01)

(52) U.S. Cl.
CPC ..... G01R 33/0076 (2013.01); G01R 33/0047 (2013.01); G01R 33/096 (2013.01)

(58) Field of Classification Search
CPC ............ G01R 33/0076; G01R 33/0047; G01R 33/096; G01R 33/0052; G01R 33/09; G01D 5/16; H10N 50/10; H10N 50/80
See application file for complete search history.

(56) References Cited

U.S. PATENT DOCUMENTS

| | | | |
|---|---|---|---|
| 6,395,388 B1 * | 5/2002 | Iwasaki | E05B 67/36 |
| | | | 324/252 |
| 6,703,132 B1 | 3/2004 | Yasuda et al. | |
| 2017/0038438 A1 | 2/2017 | Yamagami | |

FOREIGN PATENT DOCUMENTS

| | | |
|---|---|---|
| JP | H05-021863 A | 1/1993 |
| JP | H08-116108 A | 5/1996 |

(Continued)

OTHER PUBLICATIONS

International Search Report dated Feb. 15, 2022 issued in International Patent Application No. PCT/JP2021/044796, with English translation.

(Continued)

*Primary Examiner* — Feba Pothen
(74) *Attorney, Agent, or Firm* — Rimon P.C.

(57) ABSTRACT

A magnetic sensor includes an insulating substrate, at least one magnetoresistive element, a conductor, and an encapsulant. The conductor electrically connects the magnetoresistive element to an external circuit. The encapsulant encapsulates not only the magnetoresistive element entirely but also the insulating substrate and the conductor at least partially. The magnetoresistive element includes a magnetoresistive film and an electrode. The magnetoresistive film is formed on a first surface of the insulating substrate. The electrode is provided on the first surface of the insulating substrate. One end of the electrode is electrically connected to the magnetoresistive film. The other end of the electrode is electrically connected to a first end portion of the conductor. The encapsulant exposes a second surface of the insulating substrate and a second end portion of the conductor from mutually different surfaces.

14 Claims, 5 Drawing Sheets

(56) References Cited

FOREIGN PATENT DOCUMENTS

| | | | |
|---|---|---|---|
| JP | H10-289422 A | | 10/1998 |
| JP | H11-330584 A | | 11/1999 |
| JP | 2004128164 A | * | 4/2004 |
| JP | 2005-337866 A | | 12/2005 |
| JP | 2017-026312 A | | 2/2017 |
| JP | 2017-036966 A | | 2/2017 |
| JP | 2017-143208 A | | 8/2017 |
| JP | 2020-178045 A | | 10/2020 |
| WO | 01/046708 A1 | | 6/2001 |

OTHER PUBLICATIONS

Notice of Reasons for Refusal dated Sep. 9, 2025 issued in the corresponding Japanese Patent Application No. 2022-569882, with English translation.

* cited by examiner

MAGNETIC SENSOR

CROSS-REFERENCE OF RELATED APPLICATIONS

This application is the U.S. National Phase under 35 U.S.C. § 371 of International Patent Application No. PCT/JP2021/044796, filed on Dec. 6, 2021, which in turn claims the benefit of Japanese Patent Application No. 2020-210794, filed on Dec. 18, 2020, the entire disclosures of which Applications are incorporated by reference herein.

DESCRIPTION

Technical Field

The present disclosure generally relates to a magnetic sensor, and more particularly relates to a magnetic sensor including a magnetoresistive element.

Background Art

Patent Literature 1 discloses a magnetoresistive element including an insulating substrate, a pair of electrodes, an anisotropic magnetoresistive layer, a protective coating, a pair of end face electrodes, and a plating layer. The insulating substrate is made of alumina. The pair of electrodes are provided at both end portions of the upper surface of the insulating substrate. The anisotropic magnetoresistive layer is provided on the upper surface of the insulating substrate and interposed between the pair of electrodes. The protective coating covers the anisotropic magnetoresistive layer. The pair of end face electrodes are provided across the upper surface, end face, and lower surface of the insulating substrate to be electrically connected to the pair of electrodes. The plating layer is provided on the surface of the pair of end face electrodes.

The magnetic sensor is provided in the vicinity of any of various types of shafts (including a steering shaft and a drive shaft) of an automobile to detect the rotational angle, the number of revolutions, or any other parameter of the shaft, for example. The drive shaft and the region surrounding the drive shaft are located in a rigorous environment exposed to a temperature as high as 170° C. and to oil and other chemical substances. The magnetic sensor of Patent Literature 1 may also be used in such a rigorous environment, because its anisotropic magnetoresistive layer is protected by the protective coating. Nevertheless, there are increasing demands for magnetic sensors with even higher environmental tolerance.

Citation List

Patent Literature

Patent Literature 1: JP 2020-178045 A

SUMMARY OF INVENTION

It is therefore an object of the present disclosure to provide a magnetic sensor with improved environmental tolerance.

A magnetic sensor according to an aspect of the present disclosure includes an insulating substrate, at least one magnetoresistive element, a conductor, and an encapsulant. The conductor is arranged to electrically connect the at least one magnetoresistive element to an external circuit. The encapsulant encapsulates not only the at least one magnetoresistive element entirely but also the insulating substrate and the conductor at least partially. The magnetoresistive element includes a magnetoresistive film and an electrode. The magnetoresistive film is formed on a first surface of the insulating substrate. The electrode is provided on the first surface of the insulating substrate. One end of the electrode is electrically connected to the magnetoresistive film. The other end of the electrode is electrically connected to a first end portion of the conductor. The encapsulant exposes a second surface of the insulating substrate and a second end portion of the conductor from mutually different surfaces.

DESCRIPTION OF EMBODIMENTS

A magnetic sensor according to an exemplary embodiment of the present disclosure will now be described with reference to FIGS. 1-5. The drawings to be referred to in the following description of embodiments are all schematic representations. Thus, the ratio of the dimensions (including thicknesses) of respective constituent elements illustrated on the drawings does not always reflect their actual dimensional ratio. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure.

(1) Overall Configuration for Magnetic Sensor

Figure 1:
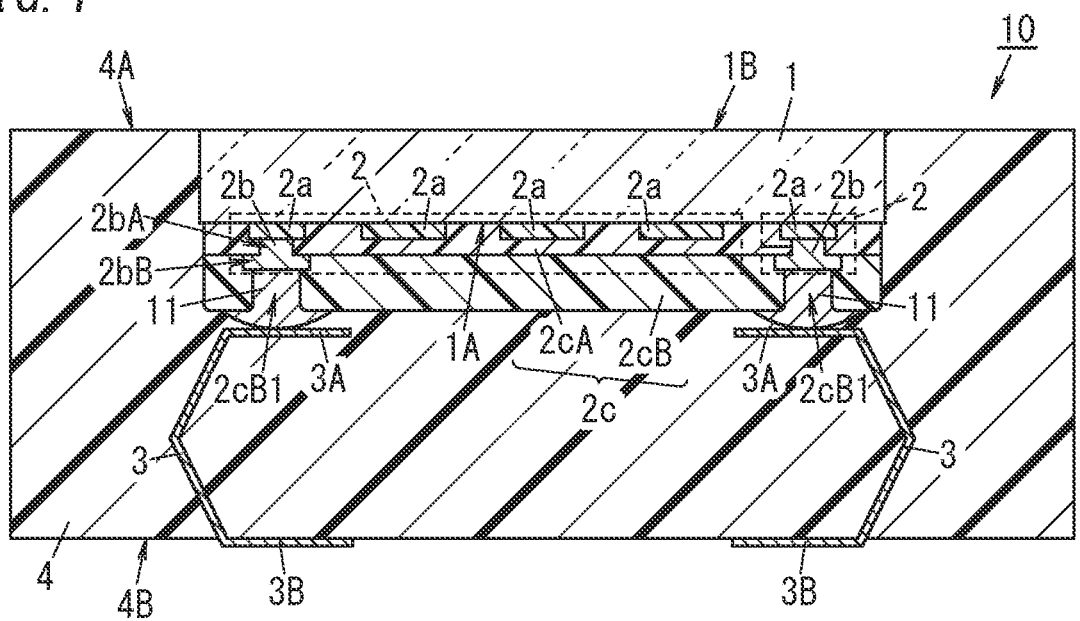
FIG. 1 is a cross-sectional view of a magnetic sensor according to an embodiment of the present disclosure.
Figure 2:
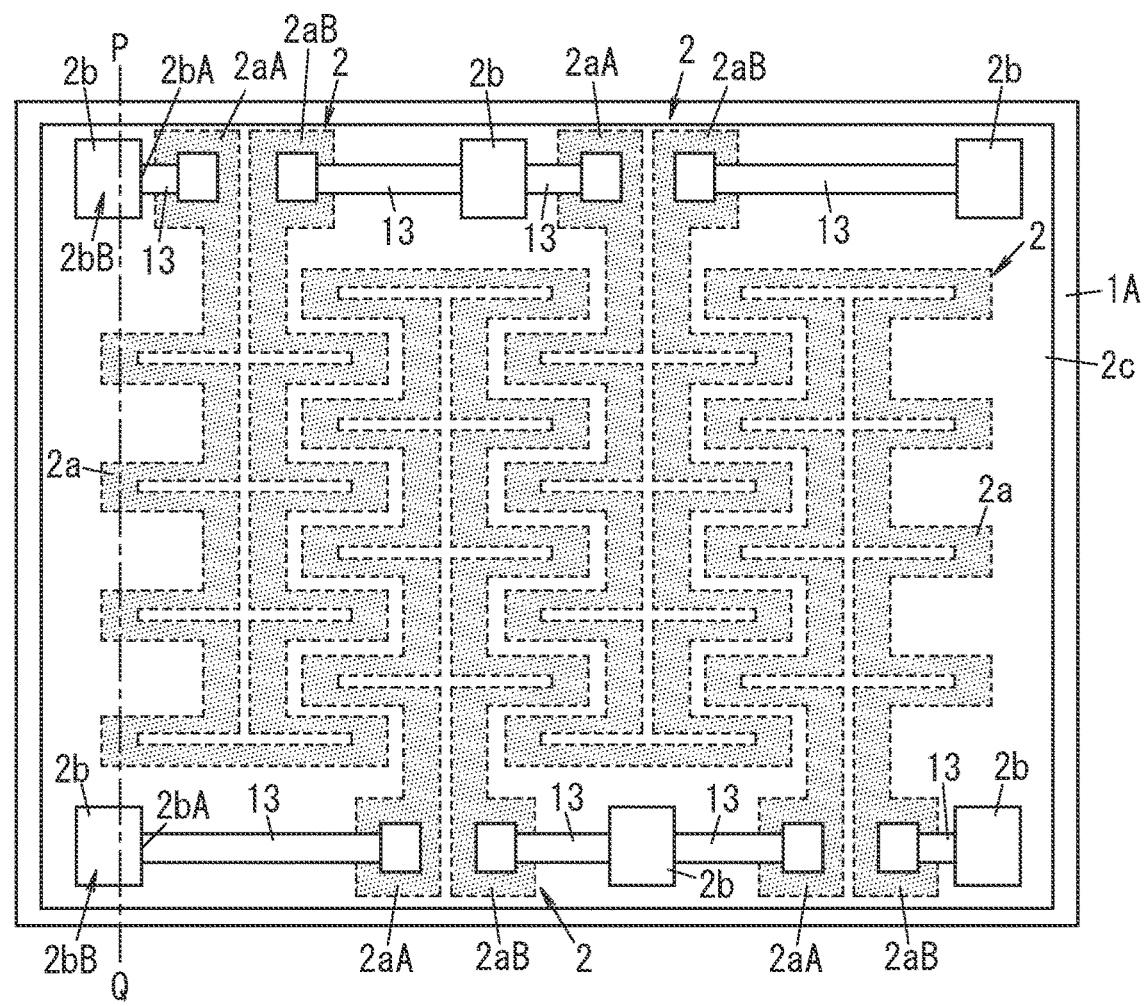
FIG. 2 is a bottom view of the magnetic sensor.
Figure 3:
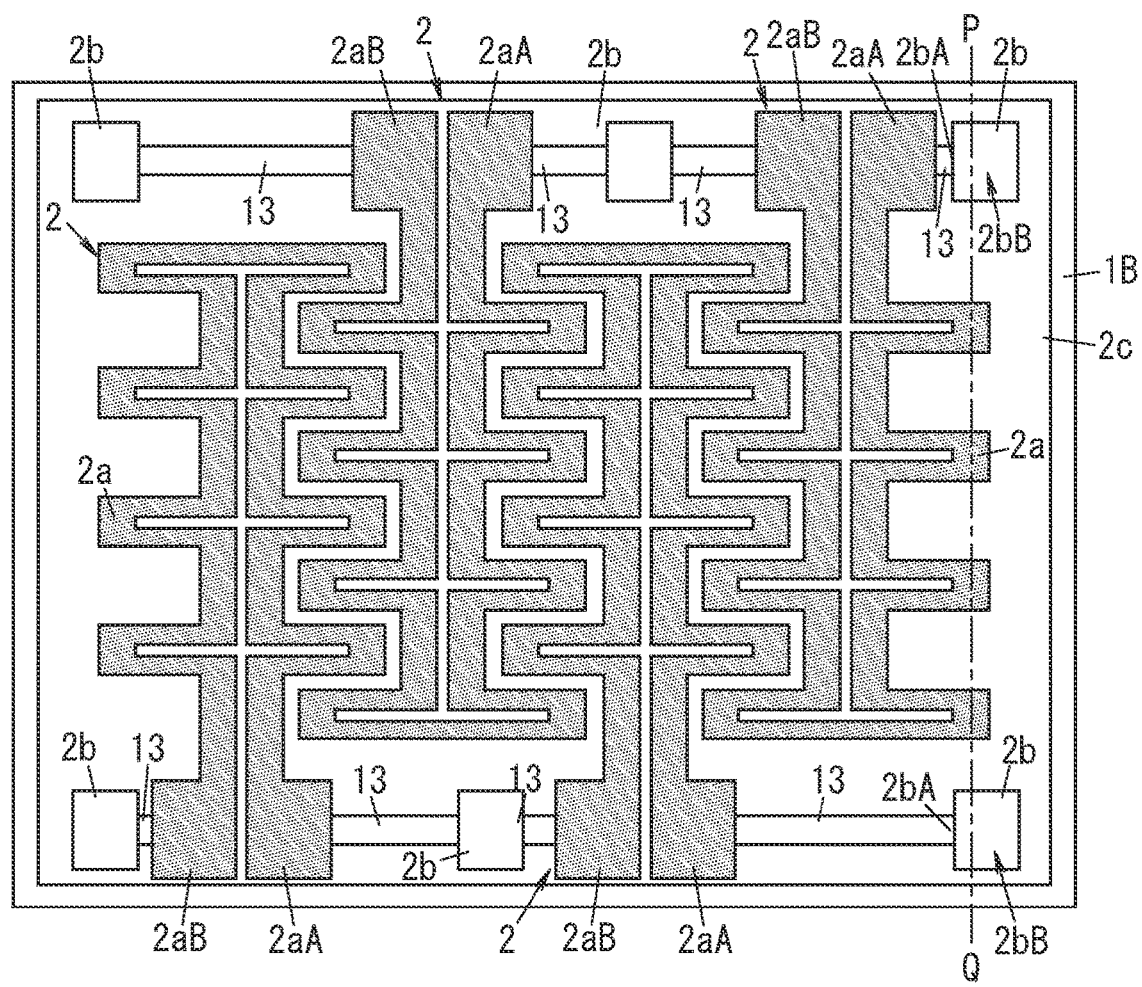
FIG. 3 is a top view of the magnetic sensor.
Figure 4:
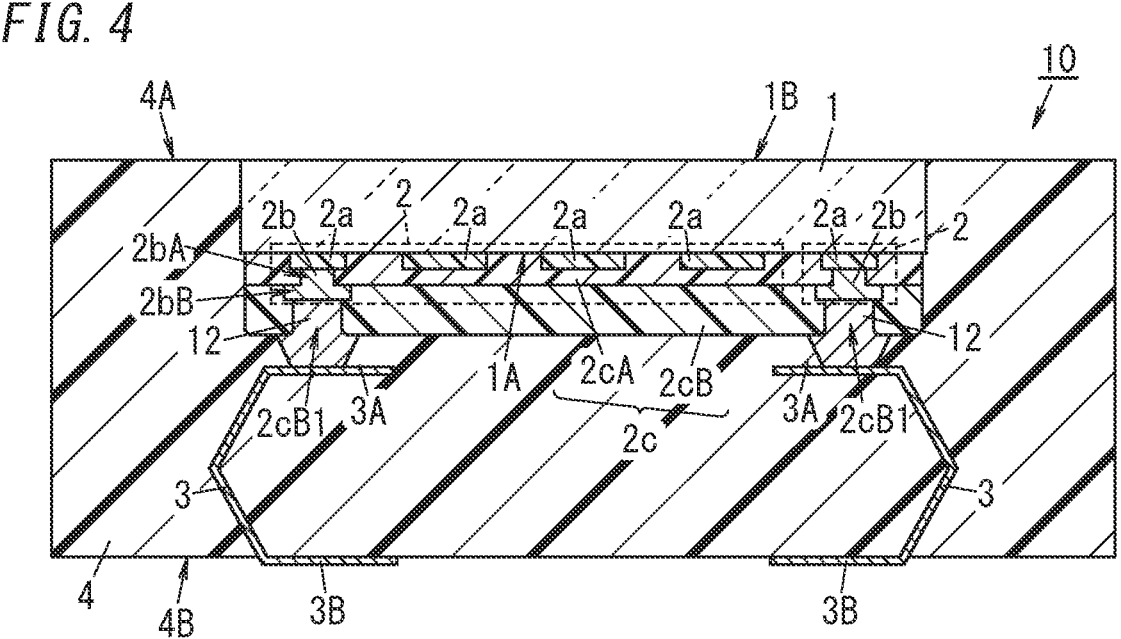
FIG. 4 is a cross-sectional view illustrating a first variation of the magnetic sensor.

A magnetic sensor 10 according to an exemplary embodiment of the present disclosure includes an insulating substrate 1, four magnetoresistive elements 2, conductors 3, and an encapsulant 4 as shown in FIGS. 1-3.

Note that FIG. 1 is a cross-sectional view taken along the plane PQ shown in FIGS. 2 and 3. In FIG. 1, the electrode 2b on the left forms part of the leftmost magnetoresistive element 2 in FIG. 2 (i.e., the rightmost magnetoresistive element 2 in FIG. 3) and the electrode 2b on the right forms part of the second leftmost magnetoresistive element 2 in FIG. 2 (i.e., the second rightmost magnetoresistive element 2 in FIG. 3).

Also, as shown in FIGS. 2 and 3, each magnetoresistive element 2 is formed by a magnetoresistive film 2a formed in a comb shape and a pair of electrodes 2b provided at one end 2aA and the other end 2aB thereof, respectively. Thus, the number of the magnetoresistive elements 2 as constituent elements of the magnetic sensor 10 is four.

In addition, some electrodes 2b out of the six electrodes 2b shown in FIGS. 2 and 3 are each shared by two magnetoresistive elements 2. Specifically, the middle one of the three electrodes 2b shown at the top of FIG. 2 is shared by the leftmost magnetoresistive element 2 and the third leftmost magnetoresistive element 2. The middle one of the three electrodes 2b shown at the bottom of FIG. 2 is shared by the second leftmost magnetoresistive element 2 and the fourth leftmost magnetoresistive element 2.

Furthermore, the four leftmost ones of the five magnetoresistive films 2a shown in the cross-sectional view of FIG. 1 correspond to the leftmost one of the four magnetoresistive elements 2 shown in FIG. 2. On the other hand, the rightmost one of the five magnetoresistive films 2a shown in the cross-sectional view of FIG. 1 corresponds to the second leftmost one of the four magnetoresistive elements 2 shown in FIG. 2.

Note that this is only an example and should not be construed as limiting. Rather the number of the magnetoresistive elements 2 that form part of the magnetic sensor 10 has only to be at least one and may also be any other number.

The insulating substrate 1 is a substrate made of a material with high insulation properties. Examples of such materials with high insulation properties include alumina, sapphire, glass, ceramics, and resins. Note that these materials are only examples and should not be construed as limiting. The insulating substrate 1 may be, for example, a thin plate having either a polygonal shape such as a rectangular or hexagonal shape or a circular shape but may have any other shape or thickness without limitation. A preferred material and a preferred thickness for the insulating substrate 1 will be described later.

The four magnetoresistive elements 2 are provided on a first surface 1A of the insulating substrate 1. As used herein, the first surface 1A refers to one surface, provided with the magnetoresistive elements 2, out of the two surfaces of the insulating substrate 1. The other surface, provided with no magnetoresistive elements 2, out of the two surfaces of the insulating substrate 1 is a second surface 1B. In a normal mounting (to be described later) mode (not shown), out of the two surfaces of the insulating substrate 1, the upper surface is the first surface, and the lower surface is the second surface. In a facedown mounting (to be described later) mode shown in FIG. 1, out of the two surfaces of the insulating substrate 1, the lower surface is the first surface 1A and the upper surface is the second surface 1B.

The magnetoresistive element 2 is an element, of which the electrical resistance changes according to the strength of the magnetic field applied. The configuration, arrangement, and other properties of the magnetoresistive elements 2 will be described later.

Each of the conductors 3 electrically connects the magnetoresistive elements 2 to an external circuit (not shown). The external circuit will be described later.

Specifically, as shown in FIG. 1, a first end portion 3A of each conductor 3 is in contact with the other end 2bB of a corresponding electrode 2b and a second end portion 3B of the conductor 3 is exposed from a second surface 4B of the encapsulant 4. As used herein, the "first end portion 3A" refers to an end portion, arranged adjacent to the magnetoresistive element 2, out of the two end portions of the conductor 3 and the "second end portion 3B" refers to an end portion, arranged opposite from the magnetoresistive element 2, out of the two end portions of the conductor 3.

The exposed second end portion 3B is electrically connected to a wire leading to an external circuit (hereinafter referred to as an "external wire"). Optionally, the conductor 3 may also be connected to the external circuit directly not via the external wire.

Note that each conductor 3 may be an elongate plate made of a metal such as copper. The conductor 3 is folded at three points along the longitudinal axis thereof such that the first end portion 3A and the second end portion 3B thereof are parallel to the insulating substrate 1 and the part between the first end portion 3A and the second end portion 3B thereof forms a V-shape as shown in FIG. 1. The V-shape part between the first end portion 3A and the second end portion 3B may have, for example, the function of relieving, by bending and stretching itself, the stress applied to the first end portion 3A and the second end portion 3B due to a difference in coefficient of expansion between the conductor 3 and the encapsulant 4.

The external circuit is a processing circuit for transforming the output of the magnetoresistive element 2 into information about the motion of the target (hereinafter referred to as "motion information") and may be implemented as, for example, a processor and a memory. For instance, in response to a signal supplied from the magnetoresistive element 2 to the external circuit, the external circuit may provide the motion information. The motion information may represent, for example, the number of revolutions of a drive shaft but may also represent the rotational angle of a steering shaft or a pedal position, for example.

The encapsulant 4 encapsulates not only the magnetoresistive elements 2 entirely but also the insulating substrate 1 and the conductors 3 at least partially. Specifically, as shown in FIG. 1, the entire magnetoresistive elements 2, the entire insulating substrate 1 but the second surface 1B thereof, and the entire conductors 3 but the second end portions 3B thereof are all encapsulated by the encapsulant 4.

In addition, the encapsulant 4 exposes the second surface 1B of the insulating substrate 1 and the second end portions 3B of the conductors 3 from mutually different surfaces. Specifically, as shown in FIG. 1, the second surface 1B of the insulating substrate 1 is exposed from a first surface 4A of the encapsulant 4 and the second end portions 3B of the conductors 3 are exposed from the second surface 4B of the encapsulant 4.

Inside the encapsulant 4, the first surface 1A of the insulating substrate 1 faces the respective first end portions 3A of the conductors 3, the one end 2bA of each electrode 2b is electrically connected to an associated magnetoresistive film 2a, and the other end 2bB of the electrode 2b is electrically connected to the first end portion 3A of an associated one of the conductors 3. As used herein, if something is "electrically connected to" something else, this expression may mean that the two things are directly in contact with each other, connected together via a wire, connected together via solder 11 or a bump 12, or whatever else.

The encapsulant 4 may be, but does not have to be, made of a resin such as a liquid crystal polymer.

As can be seen, in this magnetic sensor 10, the four magnetoresistive elements 2 in their entirety and respective parts of the insulating substrate 1 and the conductors 3 are encapsulated with the encapsulant 4. This magnetic sensor 10 is characterized in that the first surface 1A, provided with the magnetoresistive elements 2, of the insulating substrate 1 is made to face the respective first end portions 3A of the conductors 3. Consequently, the insulating substrate 1 is mounted onto the conductors 3 in such a facedown arrangement in which the first surface 1A and the second surface 1B face respectively opposite directions from a normal arrangement.

In the following description, such a mounting mode in which the insulating substrate 1 is arranged such that its first surface 1A faces the respective first end portions 3A of the conductors 3 (i.e., such that the second surface 1B thereof faces upward and the first surface 1A thereof faces downward as shown in FIG. 1) will be hereinafter referred to as "facedown mounting." On the other hand, a mounting mode in which the insulating substrate 1 is arranged such that its second surface 1B faces the respective first end portions 3A of the conductors 3 (i.e., such that the first surface 1A faces upward and the second surface 1B faces downward (not shown) as in a normal arrangement) will be hereinafter referred to as "normal mounting."

The facedown mounting makes the second surface 1B of the insulating substrate 1 and the respective second end portions 3B of the conductors 3 exposed from two different surfaces (i.e., the first surface 4A and the second surface 4B, respectively) of the encapsulant 4. This allows the magnetoresistive elements 2 to be protected effectively with the encapsulant 4 and the insulating substrate 1.

(1-1) Insulating Substrate (1-1-1) Material for insulating substrate

The magnetoresistive films 2a are formed on the first surface 1A of the insulating substrate 1. Thus, the insulating substrate 1 needs to be made of a material that ensures sufficient surface smoothness. In addition, the material for the insulating substrate 1 is preferably inexpensive.

Furthermore, in this embodiment, the second surface 1B of the insulating substrate 1 is exposed from the first surface 4A of the encapsulant 4 as described above. Therefore, the insulating substrate 1 is preferably made of a material with sufficient environmental tolerance and sufficient mechanical strength. Specifically, the environmental tolerance may be, but does not have to be, heat resistance and corrosion resistance.

The best material for the insulating substrate 1 is sapphire, because sapphire satisfies all of these conditions. Sapphire is a single crystal of aluminum oxide and has a light-transmitting property. Sapphire is preferably colorless but may also be colored.

Alternatively, glass is another optional material for the insulating substrate 1, even though glass is inferior to sapphire in environmental tolerance and mechanical strength. A preferred composition for glass may, but does not have to, include 81% of silicon dioxide, 13% of boric anhydride, 2% of aluminum oxide, and 4% of sodium oxide or potassium oxide. Glass is preferably colorless but may also be colored.

Note that sapphire and glass both ensure sufficient surface smoothness and are transparent. Thus, mirror polishing the first surface 1A and second surface 1B of the insulating substrate 1 made of either sapphire or glass makes any pattern defect caused to the magnetoresistive films 2a on the first surface 1A detectible through the second surface 1B.

That is why the insulating substrate 1 made of either sapphire or glass (hereinafter referred to as a "sapphire substrate" or a "glass substrate") is suitable to the facedown mounting. Naturally, the sapphire substrate or the glass substrate may also be used in normal mounting.

Still alternatively, zirconia is still another optional material for the insulating substrate 1 even though zirconia is inferior to sapphire and glass in surface smoothness and is more expensive than sapphire and glass.

Note that alumina is not a suitable material for the insulating substrate 1 because alumina is inferior to sapphire and glass in both surface smoothness and light-transmitting property. Nonetheless, the major advantage of the facedown mounting (i.e., the magnetoresistive films 2a may be protected effectively by the insulating substrate 1 and the encapsulant 4) is achievable, no matter what material is selected for the insulating substrate 1.

(1-1-2) Thickness of Insulating Substrate

The facedown mounting in which the insulating substrate 1 is arranged such that the first surface 1A thereof faces the respective first end portions 3A of the conductors 3 makes the distance from the magnetoresistive films 2a to the detection target (such as a magnet rotor provided for a drive shaft) longer by the thickness of the insulating substrate 1 than in the case of normal mounting in which the second surface 1B of the insulating substrate 1 faces the respective first end portions 3A of the conductors 3. Therefore, the insulating substrate 1 is preferably formed as thin as possible as far as its mechanical strength is not less than a predetermined threshold value. Note that the predetermined threshold value may be determined by experiment.

For example, an alumina substrate for use in the normal mounting has a thickness of 500-700 µm. In contrast, the sapphire substrate for use in the facedown mounting may have its thickness reduced to as small as 100 µm. As used herein, the thickness refers to the interval between the first surface 1A and the second surface 1B. Also, depending on the dimensions of the magnetic sensor 10 or the environment in which the magnetic sensor 10 is supposed to be used, the thickness of the sapphire substrate may also be reduced to less than 100 µm.

The insulating substrate 1 according to this embodiment may be formed out of, for example, a material containing sapphire as a main component to a thickness equal to or greater than 100 µm and equal to or less than 150 µm. This would improve both the environmental tolerance and detection accuracy of the magnetic sensor 10.

(1-1-3) Surfaces of Insulating Substrate

The insulating substrate 1 made of either sapphire or glass has its first surface 1A and second surface 1B mirror polished. Mirror polishing the first surface 1A allows the magnetoresistive films 2a to be formed with high accuracy on the first surface 1A. In addition, mirror polishing the second surface 1B as well makes any pattern defect, caused to the magnetoresistive films 2a on the first surface 1A, detectible through the second surface 1B as well, because sapphire and glass are transparent. Such a defect is usually detected by image processing using an image sensor and a processor, for example, but is also detectible with human eyes through a microscope.

(1-2) Magnetoresistive Element

The magnetoresistive elements 2 each include the magnetoresistive film 2a, the electrode 2b, and the protective coating 2c, all of which are formed on the first surface 1A of the insulating substrate 1.

(1-2-1) Magnetoresistive Film

The magnetoresistive film 2a has magnetic anisotropy. The magnetoresistive film 2a may be formed out of an alloy (such as a permalloy), containing a ferromagnetic metal such as nickel or iron as a main component, to a thickness falling within the range from a few nanometers to 10-odd nanometers (e.g., 10 nm). The magnetoresistive film 2a may be formed by, for example, evaporation or sputtering. However, the magnetoresistive film 2a may also be made of any other suitable material, have any other suitable thickness, and be formed by any other suitable method without limitation.

The magnetoresistive film 2a is patterned into a predetermined shape. In this embodiment, the magnetoresistive film 2a has a comb shape in which a plurality of teeth are arranged symmetrically with respect to a centerline as shown in FIGS. 2 and 3. On the first surface 1A of the insulating substrate 1, four comb-shape magnetoresistive films 2a are alternately arranged. However, this is only an example and the magnetoresistive film 2a may also have any other suitable shape.

(1-2-2) Electrode

Each electrode 2b has one end 2bA thereof electrically connected to an associated magnetoresistive film 2a and the other end 2bB thereof electrically connected to the first end portion 3A of an associated one of the conductors 3.

In this embodiment, in one magnetoresistive element 2 (e.g., the leftmost one in FIG. 2 and the rightmost one in FIG. 3), one end 2bA of the electrode 2b is connected to one end 2aA of the magnetoresistive film 2a via a conductive wire 13, for example, and the other end 2bB of the electrode 2b is connected to the first end portion 3A of the conductor 3 via solder 11 as shown in FIGS. 2 and 3. In addition, the other end 2aB of the magnetoresistive film 2a is connected to the electrode 2b shared with another magnetoresistive element 2 (e.g., the third leftmost one in FIG. 2 and the third rightmost one in FIG. 3) via a conductive wire 13. However, this pattern of connection between the elements is only an example and should not be construed as limiting.

Note that the structure and arrangement of the electrodes 2b described above are only examples. Rather the electrodes 2b may have any other structure or arrangement as long as the electrodes 2b may extract a signal representing, for example, a voltage corresponding to the electrical resistance, from the magnetoresistive films 2a.

(1-2-3) Protective Coating

The protective coating 2c protects the magnetoresistive films 2a. In this embodiment, the protective coating 2c consists of two layers, namely, an inorganic protective film 2cA and an organic protective film 2cB, as shown in FIG. 1. Such a protective coating 2c consisting of these two layers is formed to cover the first surface 1A of the insulating substrate 1 either entirely or substantially entirely.

The inorganic protective film 2cA may be formed out of a material such as silicon nitride or silicon oxide to a thickness of 1 μm, for example. The organic protective film 2cB may be formed out of a material such as a polyimide resin to a thickness of a few μm, for example. The organic protective film 2cB also has the function of increasing the pressure tightness during the mounting process.

First, the magnetoresistive films 2a are formed on the first surface 1A of the insulating substrate 1. Thereafter, the inorganic protective film 2cA and the organic protective film 2cB are sequentially formed thereon. The inorganic protective film 2cA and the organic protective film 2cB may be formed by, for example, evaporation or sputtering.

Forming the dual-layer protective coating 2c out of two different materials in this manner significantly reduces the chances of the magnetoresistive films 2a being damaged while the magnetoresistive elements 2 are mounted onto the conductor 3.

As shown in FIG. 1, the electrodes 2b according to this embodiment are slightly thicker than the inorganic protective film 2cA. Thus, the other end 2bB of each of the electrodes 2b penetrates through the inorganic protective film 2cA to reach the organic protective film 2cB. A hole 2cB1 that allows the solder 11 to pass therethrough at least partially has been provided in advance through the organic protective film 2cB. Pouring molten solder 11 into the hole 2cB1 and solidifying the solder 11 allows the other end 2bB of each electrode 2b to be electrically connected to the first end portion 3A of the associated conductor 3.

Alternatively, an electrode 2b, of which the length is greater than the thickness of the protective coating 2c, may also be used. In that case, the other end 2bB of the electrode 2b penetrates through the protective coating 2c to be directly connected to the first end portion 3A of the conductor 3.

Still alternatively, the protective coating 2c may also consist of three or more layers to further reduce the chances of doing damage to the magnetoresistive films 2a during the mounting process.

Yet alternatively, the protective coating 2c may also consist of a single layer (not shown) of an organic material or an inorganic material. Even the single-layer protective coating 2c may also reduce the chances of doing damage to the magnetoresistive films 2a during the mounting process.

Yet alternatively, the first surface 1A of the insulating substrate 1 may be covered with no protective coatings at all. In that case, after the mounting process, the insulating substrate 1, the magnetoresistive elements 2, and the conductors 3 are encapsulated with the encapsulant 4 with only the second surface 1B of the insulating substrate 1 and the respective second end portions 3B of the conductors 3 exposed from the encapsulant 4. The magnetoresistive elements 2 that have not been damaged during the mounting process are protected from the external environment by the insulating substrate 1 and the encapsulant 4.

Yet alternatively, the protective coating 2c may be formed in only a part of the first surface 1A of the insulating substrate 1 as in the second variation to be described below.

As can be seen, the protective coating 2c may consist of any number of layers, may be made of any material, and may be formed by any method.

(1-3) First Variation

The hole 2cB1 provided through the protective coating 2c may allow a bump 12 to pass therethrough at least partially. Inserting and crimping the bump 12 into the hole 2cB1 allows the other end 2bB of each electrode 2b to be electrically connected to the first end portion 3A of the associated conductor 3.

This allows the electrodes 2b and the protective coating 2c to be bonded more tightly onto the respective first end portions 3A of the conductors 3, thus further relieving the stress to be applied to the mounting portion.

A material for the bump 12 is preferably gold. However, this is only an example and should not be construed as limiting. Alternatively, the bump 12 may also be made of copper, indium, or any other suitable material. Also, the bump 12 may also be formed by plating, wire-bonding, or any other suitable method.

(1-4) Second Variation

Figure 5:
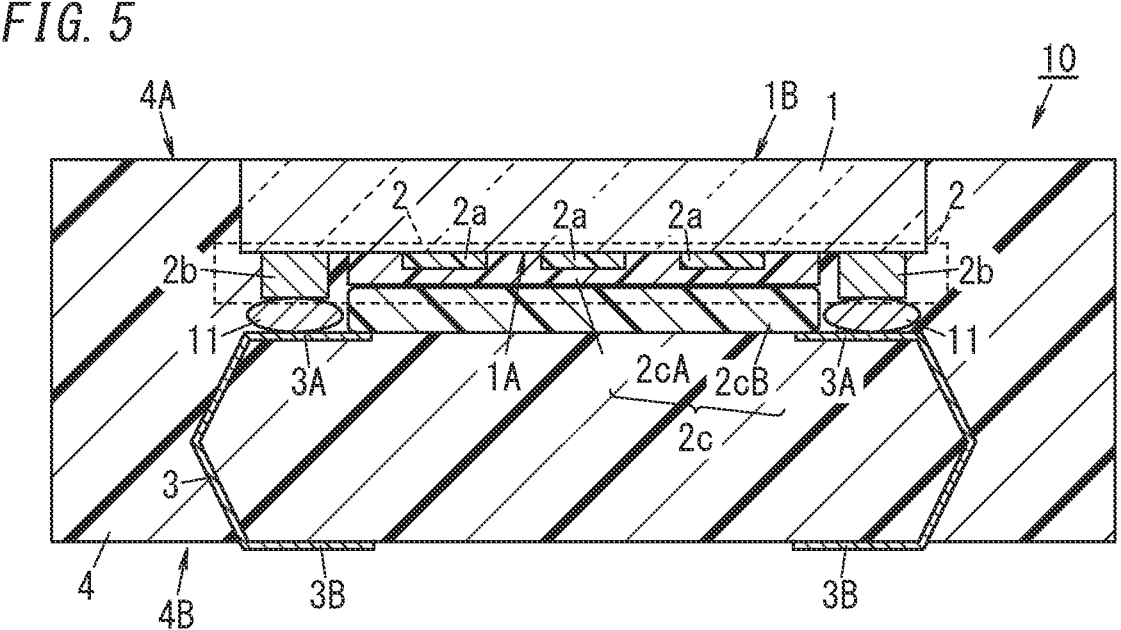
FIG. 5 is a cross-sectional view illustrating a second variation of the magnetic sensor.

As shown in FIG. 5, the protective coating 2c may be formed on only a part of the first surface 1A of the insulating substrate 1 and the electrodes 2b may be formed in the other parts, from which the protective coating 2c is absent, of the first surface 1A of the insulating substrate 1.

Forming the protective coating 2c and the electrode 2b for mutually different parts of the first surface 1A of the insulating substrate 1 in this manner eliminates the need to provide the holes 2cB1 through the protective coating 2c, thus making it easier to perform the mounting process.

(2) Exemplary Uses of Magnetic Sensor

The magnetic sensor 10 is normally provided in the vicinity of a magnet (not shown) moving along with the target (not shown) and is connected to the external circuit (not shown) via an external wire. That is to say, the magnetic sensor 10 forms, along with the magnet and the external circuit, a magnetic encoder.

As used herein, the "target" refers to a detection target for the magnetic sensor 10. The target may be a rotator, for example. The rotator may be, for example, a shaft of an automobile. The shaft is preferably a drive shaft but may also be a steering shaft or any other suitable type of shaft without limitation. Note that the region surrounding the drive shaft is a rigorous environment exposed to a temperature as high as 170° C. and to oil and other chemical substances as described above. Note that the shaft is only an exemplary target and should not be construed as limiting. Alternatively, the target may also be a mover such as a pedal or any other moving object.

The magnet is normally a permanent magnet, and its material may be ferrite or alnico, for example. However, this is only an exemplary material, and the magnet may also be made of any other material with magnetism. The magnet moving along with the target may be, for example, a drum-shaped magnet rotor provided for, and moving along with, the rotator. Alternatively, the magnet moving along with the target may also be a tablet-shaped or liner magnet provided for, and moving along with, the mover. That is to say, the magnet may move in any other suitable pattern and may have any other suitable shape. Note that if the target has magnetism, the magnet may be omitted. Nevertheless, providing the magnet would improve the detection accuracy.

For example, if the magnetic sensor 10 is provided in the vicinity of a magnet rotor that rotates along with a shaft, the magnetic field generated by the magnet rotor changes as the shaft rotates or changes its rotational velocity, thus causing a variation in the electrical resistance of the magnetoresistive elements 2. On the other hand, if the magnetic sensor 10 is provided in the vicinity of a tablet magnet that moves along with a pedal, the magnetic field changes according to the position or moving velocity of the pedal, thus causing a variation in the electrical resistance of the magnetoresistive elements 2. The magnetoresistive elements 2 may output, for example, a signal representing a voltage or current corresponding to the electrical resistance.

The output of the magnetoresistive elements 2 is supplied to an external circuit, which provides motion information about the number of revolutions of the drive shaft, for example.

Note that the external circuit such as a processor usually has a lesser degree of environmental tolerance than the magnetic sensor 10. Thus, the external circuit is provided at a position distant from the drive shaft (e.g., in a dashboard) and connected to the magnetic sensor 10 via an external wire. Alternatively, the external circuit may be provided in the vicinity of the magnetic sensor 10 and directly connected to the second end portions 3B of the conductors 3 that forms part of the magnetic sensor 10.

In the magnetic sensor 10, the second surface 1B of the insulating substrate 1 and the respective second end portions 3B of the conductors 3 are exposed from the encapsulant 4 as described above, and therefore, the magnetoresistive elements 2 are protected effectively with the insulating substrate 1 and the encapsulant 4. In addition, the magnet contributes to improving the detection accuracy of the magnetoresistive elements 2. Consequently, this improves the environmental tolerance and detection accuracy of the magnetic sensor 10.

Therefore, the magnetic sensor 10 according to the exemplary embodiment of the present disclosure enables, even when used in a rigorous environment such as the vicinity of a drive shaft, preventing the magnetoresistive elements 2 from being damaged and thereby detecting the number of revolutions, for example, highly accurately.

(3) Recapitulation

As can be seen from the foregoing description, a magnetic sensor (10) according to a first aspect of the present disclosure includes an insulating substrate (1), at least one magnetoresistive element (2), a conductor (3), and an encapsulant (4). The conductor (3) is arranged to electrically connect the at least one magnetoresistive element (2) to an external circuit. The encapsulant (4) encapsulates not only the at least one magnetoresistive element (2) entirely but also the insulating substrate (1) and the conductor (3) at least partially.

The at least one magnetoresistive element (2) includes a magnetoresistive film (2a) and an electrode (2b). The magnetoresistive film (2a) is formed on a first surface (1A) of the insulating substrate (1). The electrode (2b) is provided on the first surface (1A) of the insulating substrate (1). One end (2aA) of the electrode (2b) is electrically connected to the magnetoresistive film (2a). The other end (2aB) of the electrode (2b) is electrically connected to a first end portion (3A) of the conductor (3).

The encapsulant (4) exposes a second surface (1B) of the insulating substrate (1) and a second end portion (3B) of the conductor (3) from mutually different surfaces (namely, the first surface 4A and the second surface 4B).

According to this aspect, making the first surface (1A), provided with the magnetoresistive film (2a), of the insulating substrate (1) face the first end portion (3A) of the conductor (3) exposes the second surface (1B) of the insulating substrate (1) and the second end portion (3B) of the conductor (3) from the encapsulant (4), thus allowing the magnetoresistive element (2) to be protected effectively with the insulating substrate (1) and the encapsulant (4). Consequently, this improves the environmental tolerance of the magnetic sensor (10).

In a second aspect, which may be implemented in conjunction with the first aspect, the at least one magnetoresistive element (2) further includes a protective coating (2c) formed on the first surface (1A) of the insulating substrate (1) to protect the magnetoresistive film (2a).

This aspect allows the magnetoresistive element (2) to be securely mounted on the conductor (3), because the magnetoresistive film (2a) is protected with the protective coating (2c) at the time of the mounting process.

In a third aspect, which may be implemented in conjunction with the second aspect, the protective coating (2c) is formed to cover the first surface (1A) of the insulating substrate (1) either entirely or substantially entirely. The other end (2aB) of the electrode (2b) is electrically connected to the first end portion (3A) of the conductor (3) by letting the other end (2bB) of the electrode (2b) penetrate through the protective coating (2c) and/or providing a hole (2cB1) through the protective coating (2c) to allow solder (11) or a bump (12) to pass through the hole (2cB1).

This aspect relieves the stress applied to a part, coming into contact with the conductor (3) during mounting, of the magnetoresistive element (2) on the first surface (1A) of the insulating substrate (1).

In a fourth aspect, which may be implemented in conjunction with the third aspect, the protective coating (2c) includes: an inorganic protective film (2cA) formed on the magnetoresistive film (2a) on the insulating substrate (1); and an organic protective film (2cB) formed on the inorganic protective film (2cA). The electrode (2b) penetrates through at least the inorganic protective film (2cA) to reach the organic protective film (2cB). The organic protective film (2cB) has a hole (2cB1) that allows the solder (11) or the bump (12) to pass through at least partially.

This aspect allows the magnetoresistive film (2a) to be protected even more effectively at the time of mounting by using the protective coating consisting of two different layers (namely, the inorganic protective film 2cA and the organic protective film 2cB). In addition, providing the hole (2cB1) through the organic protective film (2cB) makes it easier to perform the mounting process using the solder (11) or the bump (12).

In a fifth aspect, which may be implemented in conjunction with the second aspect, the protective coating (2c) is formed on a part of the first surface (1A) of the insulating substrate (1). The electrode (2b) is provided on a remaining part, from which the protective coating (2c) is absent, of the first surface (1A) of the insulating substrate (1).

This aspect makes it easier to perform the mounting process by forming the protective coating (2c) and the electrode (2b) on mutually different parts of the first surface (1A) of the insulating substrate (1).

In a sixth aspect, which may be implemented in conjunction with any one of the first to fifth aspects, the insulating substrate (1) is made of a material containing sapphire as a main component.

This aspect allows the magnetoresistive element (2) to be protected effectively by using sapphire with sufficient environmental tolerance. In addition, sapphire has mechanical strength high enough to reduce the thickness of the insulating substrate (1), thus contributing to improving the detection accuracy as well. Furthermore, sapphire has so high smoothness and light-transmitting property that mirror polishing the first surface (1A) and the second surface (1B) makes any pattern defect, caused to the magnetoresistive film (2a) on the first surface (1A), detectible through the second surface (1B).

In a seventh aspect, which may be implemented in conjunction with the sixth aspect, the insulating substrate (1) has a thickness equal to or greater than 100 μm and equal to or less than 150 μm.

This aspect contributes to improving not only the environmental tolerance but also the detection accuracy.

In an eighth aspect, which may be implemented in conjunction with the sixth or seventh aspect, the insulating substrate (1) has the first surface (1A) and second surface (1B) thereof mirror polished.

This aspect allows the magnetoresistive film (2a) to be formed with high accuracy on the first surface (1A). In addition, this aspect also allows any pattern defect caused to the magnetoresistive film (2a) on the first surface (1A) to be detected through the second surface (1B).

REFERENCE SIGNS LIST

1 Insulating Substrate
1A First Surface
1B Second Surface
2 Magnetoresistive Element
2a Magnetoresistive Film
2aA One End
2aB The Other End
2b Electrode
2bA One End
2bB The Other End
2c Protective Coating
2cA Inorganic Protective Film
2cB Organic Protective Film
2cB1 Hole
3 Conductor
3A First End Portion
3B Second End Portion
4 Encapsulant
4A First Surface
4B Second Surface
10 Magnetic Sensor
11 Solder
12 Bump

The invention claimed is:

1. A magnetic sensor comprising:
an insulating substrate having a first surface and a second surface opposite to the first surface;
at least one magnetoresistive element;
a conductor arranged to electrically connect the at least one magnetoresistive element to an external circuit, and having a first end portion and a second end portion different from the first end portion; and
an encapsulant that encapsulates not only the at least one magnetoresistive element entirely but also the insulating substrate and the conductor at least partially, wherein:
the magnetoresistive element includes:
a magnetoresistive film formed on the first surface of the insulating substrate; and
an electrode provided on the first surface of the insulating substrate, one end of the electrode being electrically connected to the magnetoresistive film, the other end of the electrode being electrically connected to the first end portion of the conductor, and
the encapsulant exposes the second surface of the insulating substrate and the second end portion of the conductor from mutually different surfaces.

2. The magnetic sensor of claim 1, wherein
the at least one magnetoresistive element further includes a protective coating formed on the first surface of the insulating substrate to protect the magnetoresistive film.

3. The magnetic sensor of claim 1, wherein
the insulating substrate is made of a material containing sapphire as a main component.

4. The magnetic sensor of claim 3, wherein
the insulating substrate has a thickness equal to or greater than 100 μm and equal to or less than 150 μm.

5. The magnetic sensor of claim 3, wherein
the insulating substrate has the first surface and second surface thereof mirror polished.

6. A magnetic sensor comprising:
an insulating substrate;
at least one magnetoresistive element;
a conductor arranged to electrically connect the at least one magnetoresistive element to an external circuit; and
an encapsulant that encapsulates not only the at least one magnetoresistive element entirely but also the insulating substrate and the conductor at least partially, wherein:
the magnetoresistive element includes:
a magnetoresistive film formed on a first surface of the insulating substrate; and
an electrode provided on the first surface of the insulating substrate, one end of the electrode being electrically connected to the magnetoresistive film, the other end of the electrode being electrically connected to a first end portion of the conductor, the encapsulant exposes a second surface of the insulating substrate and a second end portion of the conductor from mutually different surfaces, the at least one magnetoresistive element further includes a protective coating formed on the first surface of the insulating substrate to protect the magnetoresistive film, the protective coating is formed to cover the first surface of the insulating substrate either entirely or substantially entirely, and the other end of the electrode is electrically connected to the first end portion of the conductor by at least one of letting the other end of the electrode penetrate through the protective coating or providing a hole through the protective coating to allow solder or a bump to pass through the hole.

7. The magnetic sensor of claim 6, wherein:

the protective coating includes:
  an inorganic protective film formed on the magnetoresistive film on the insulating substrate; and
  an organic protective film formed on the inorganic protective film, the electrode penetrates through at least the inorganic protective film to reach the organic protective film, and the organic protective film has a hole that allows the solder or the bump to pass through at least partially.

8. The magnetic sensor of claim 6, wherein the insulating substrate is made of a material containing sapphire as a main component.

9. The magnetic sensor of claim 8, wherein the insulating substrate has a thickness equal to or greater than 100 μm and equal to or less than 150 μm.

10. The magnetic sensor of claim 8, wherein the insulating substrate has the first surface and second surface thereof mirror polished.

11. A magnetic sensor comprising:
an insulating substrate;
at least one magnetoresistive element;
a conductor arranged to electrically connect the at least one magnetoresistive element to an external circuit; and
an encapsulant that encapsulates not only the at least one magnetoresistive element entirely but also the insulating substrate and the conductor at least partially,
wherein:
the magnetoresistive element includes:
  a magnetoresistive film formed on a first surface of the insulating substrate; and
  an electrode provided on the first surface of the insulating substrate, one end of the electrode being electrically connected to the magnetoresistive film, the other end of the electrode being electrically connected to a first end portion of the conductor,
the encapsulant exposes a second surface of the insulating substrate and a second end portion of the conductor from mutually different surfaces,
the at least one magnetoresistive element further includes a protective coating formed on the first surface of the insulating substrate to protect the magnetoresistive film,
the protective coating is formed on a part of the first surface of the insulating substrate, and
the electrode is provided on a remaining part, from which the protective coating is absent, of the first surface of the insulating substrate.

12. The magnetic sensor of claim 11, wherein the insulating substrate is made of a material containing sapphire as a main component.

13. The magnetic sensor of claim 12, wherein the insulating substrate has a thickness equal to or greater than 100 μm and equal to or less than 150 μm.

14. The magnetic sensor of claim 12, wherein the insulating substrate has the first surface and second surface thereof mirror polished.

* * * * *